United States Patent [19]

Lecailtel et al.

[11] 3,795,405
[45] Mar. 5, 1974

[54] CLAMPING OF PARTS BY ADHERENCE ON AXIAL THRUST SUPPORT

[75] Inventors: Pierre Lecailtel; Bruno Dressler, both of Billancourt, France

[73] Assignees: Regie Nationale Des Usines Renault, Billancourt; Automobiles Peugeot, Paris, both of, France

[22] Filed: Dec. 2, 1971

[21] Appl. No.: 204,151

[30] Foreign Application Priority Data
Dec. 4, 1970  France .............................. 70.43694
Nov. 24, 1971 France .............................. 71.42070

[52] U.S. Cl. ..................... 279/1 L, 269/50, 269/52, 279/5
[51] Int. Cl. ............................................. B23b 5/24
[58] Field of Search ........ 279/5, 1 J, 1 L, 1 R; 90/1, 90/88; 269/49, 50, 52, 47, 63; 29/559

[56] References Cited
UNITED STATES PATENTS

| | | | |
|---|---|---|---|
| 3,460,239 | 8/1969 | Nix ....................................... | 29/559 |
| 1,714,555 | 5/1929 | Gallimore et al. .................. | 279/1 R |
| 2,646,152 | 7/1953 | Retz ..................................... | 279/5 X |
| 2,995,989 | 8/1961 | Leboime ............................. | 269/52 X |
| 2,558,005 | 6/1951 | Sciaky ................................ | 269/52 X |
| 3,200,711 | 8/1965 | Rogg ................................... | 269/50 X |
| 3,664,227 | 5/1972 | Fischer ................................ | 90/1 UX |

*Primary Examiner*—Roy Lake
*Assistant Examiner*—James F. Coan
*Attorney, Agent, or Firm*—Stevens, Davis, Miller & Mosher

[57] ABSTRACT

A clamping device, especially for pistons of internal combustion motors, permitting previous indexing and ensuring the handling and maintenance in position of the said pistons during the half-finish and finish machining operations of the skirt and the lands of said pistons.

The device comprises a receiving member in frontal support of the head of a workpiece, presenting, centering and indexing members for the piece towards the said receiving member, and members intended to apply the piece against the presenting member by supporting the face of the head of the piece opposite to its face which is frontally supported against the receiving member.

5 Claims, 5 Drawing Figures

3,795,405

CLAMPING OF PARTS BY ADHERENCE ON AXIAL THRUST SUPPORT

The present invention relates to a clamping device permitting previous indexing and ensuring the clamping and maintenance in position of engine pistons during semi-finish and finish machining operations of the skirts and the lands.

These machining operations give their final form to the profile of the generator line and the rectangular sections of the pistons. Until the last few years, only the machining of the skirt of the piston was required to comply with severe tolerances necessitating the use of a copying machine. During this machining, the gripping of the part was effected by a claw chuck gripping the first land of the head.

There is now a tendency to make the lands help in the guiding of the pistons and to require from them new qualities. These lands must in particular have a complex rectangular section, at the same time being perfectly concentric to the skirt. In consequence, it is now not only the skirt of the pistons which must be machined on a copying machine, but the whole of the generator line profile of the piston.

A machining operation of this kind is effected according to the invention by means of a new clamping device for the work-pieces. This device has the following advantages :

It leaves the whole generator line of the piece free for machining, gives good trueing and good centering of the piece and causes minimum deformation due to clamping while permitting previous automatic indexing.

Up to the present time, efforts have been made to obtain such a result by effecting clamping of the piece by means of a claw chuck, using a boss machined on the compression face of the piston.

This solution provides good trueing and good centering of the piece without deformation of the holding means of the piece, but it is expensive since it requires additional operations, firstly for the machining and then for removing the boss. It becomes very expensive when the compression face of the piston is required to be machined.

The clamping device for pistons forming the object of the invention comprises essentially a receiving member frontally supporting the head of the piece, members for presenting, centering and indexing the piece towards the reception member, and devices intended to apply the piece against the presenting member by pressing against the face of the head of the piece opposite to its frontal support face on the reception member.

According to a particular form of embodiment of the invention, the reception member is a circular plate carrying three supports cut so as to present, each, four truncated pyramid points. These three supports are provided in the vicinity of the periphery of the plate and are angularly spaced apart by 120°. The plate, which also comprises three retractable contact fingers serving to support the piston during indexing, is surrounded by a retractable ring.

The presentation and indexing members comprise essentially an oscillating thrust rod free for rotation about its own axis, elastically coupled to a thrust body, and two indexing fingers rigidly fixed to the thrust body and intended to serve as an angular abutment for the bosses of the axis holes of the piston during indexing.

The thrust rod which has especially the purpose of forcing the piston against the plate, is coupled to the thrust body, the displacement of which with respect to the fixed portion of the presenting member is ensured by two oppositely acting jacks. The coupling between the rod and the thrust body is effected in a predetermined manner by two springs acting independently of each other, according to the force required for clamping.

By virtue of this clamping device, the skirt of the piston is entirely free for machining. During semi-finish machining, the applied supporting force is about three times greater than in the case of finish-machining.

In this device, the head of the workpiece, for example the upper face of a piston, is applied against a reception member complete with centering and indexing members for the piece towards the said centering member, thrust members, in the present case a central supporting finger, applying the piece, by pressure on the face opposite to the head-face, against the receiving member.

In the case of pistons, this arrangement has the advantage on the one hand of completely freeing the outer cylindrical face, which enables it to be machined without repeating the operation, and on the other hand it limits the supporting and clamping points to the face of the piston head in the absence of any direct mechanical stress on the skirt, which reduces the risk of deformation due to clamping.

However, since technical development is leading to lighter and lighter pistons and therefore to smaller thicknesses of diaphragm plates on the head-face and the skirt, it appeared that non-coincidence of the supports on each side of the head face could result in certain cases in elastic clamping deformations on the skirt. Furthermore, the precision of centering by rings is conditioned by the accuracy of the diameter of the rough piston and their adjustment.

The present invention provides a solution for these problems while at the same time it simplifies the previous form of construction.

The clamping device according to the invention is characterized by the fact that the receiving member is a circular plate carrying a number of supports placed in the vicinity of the periphery of the plate, the presenting members comprising a thrust rod carrying a rocking lever mounted with a swivel joint on the extremity of the thrust rod, the said rocking lever comprising a number of points which co-operate on the internal face of the piston head with the said supports of the circular plate.

According to a preferred form of construction of this device, the clamping is modified as follows :

Centering : this is effected by three retractable elastic fingers moving in synchronism along the generator lines of a cone ;

Clamping by internal thrust : the thrust is applied at three points level with the supports of the plate, through the intermediary of three toes mounted on a rocking lever articulated by a swivel joint on the extremity of the thrust rod. There is therefore no deformation of the piston as a result of its clamping, due to the fact of the coincidence of the points of support on each side of the diaphragm plate ;

Indexing : The piston is installed pre-indexed. Fine indexing is effected by a member comprising V-shaped portions which is supported on the bosses of the shaft hole and angularly positions the piston with precision. This indexing is effected during the forward movement of the thrust rod ;

Clamping force : The previous modifications render superfluous the necessity of creating two different conditions of force for the indexing and finish machining on the one hand, and for the rough machining on the other.

The present invention will now be illustrated by means of the description which follows of a particular device given with reference to the accompanying drawings, in which :

FIG. 3 represents a view from above of a support of the piston-carrier plate ;

FIG. 4 shows a view of the support shown in FIG. 3, in cross-section taken along line IV—IV ;

Figure 1:
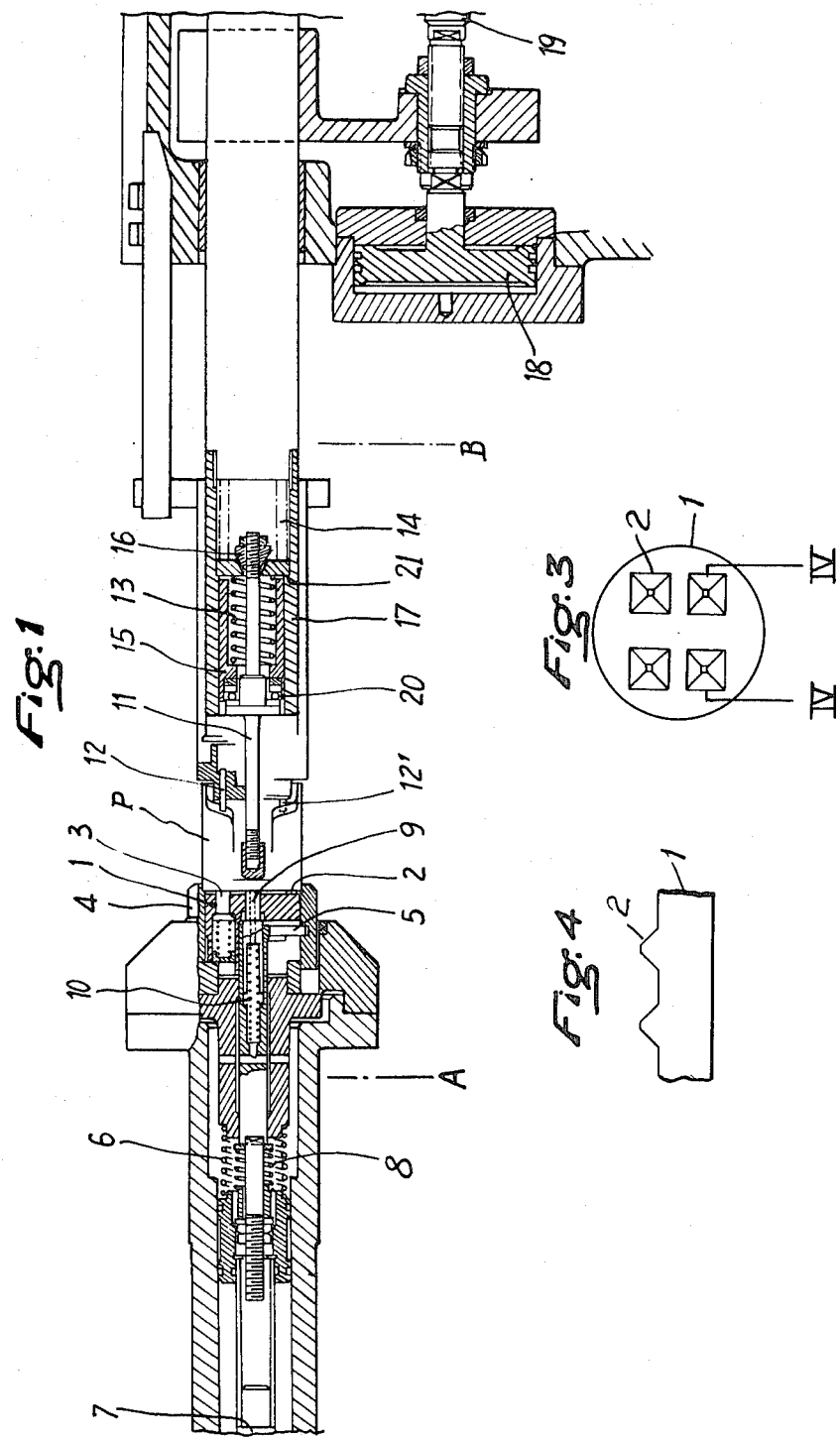
FIG. 1 represents a general view of the device in cross-section.

The device according to the invention comprises a piston-carrier plate 1 equipped with three supports 2 spaced apart by 120° and each constituted by four truncated pyramid toes.

Also at the periphery of the plate 1 and at 120° from each other are placed three contact fingers 3 against which is applied the compression face of the piston at the moment of its indexing.

The plate 1 is enclosed by a retractable centering ring 4. The forward and reverse movement of this ring are controlled by a member 5. A spring 6 urges the ring 4 in reverse, while a jack 7 causes its forward movement. A spring 8 acting on the ring 4 adds its action to that of the three elastic fingers 3 and of the piston ejector 9. The result is that the piston is only in contact with the fingers 3 during the indexing ; as the ring 4 is withdrawn during machining, the support is effected at 2.

A thrust rod 11 is mounted on a ball abutment 20 and is for that reason free to rotate. Two indexing fingers 12 and 12' are intended to be supported against the bosses of the shaft holes of the pistons. A spring 13, provided for indexing and finish machining, is rigidly fixed to the slide 15. A spring 14, provided for semi-finish machining, is supported against the circular plate 16 which abuts against the shoulder 21 of the thrust body. The forward or reverse movement of the thrust body 17 is controlled by the oppositely-acting jacks 18 and 19.

OPERATION OF THE DEVICE

Figure 2:
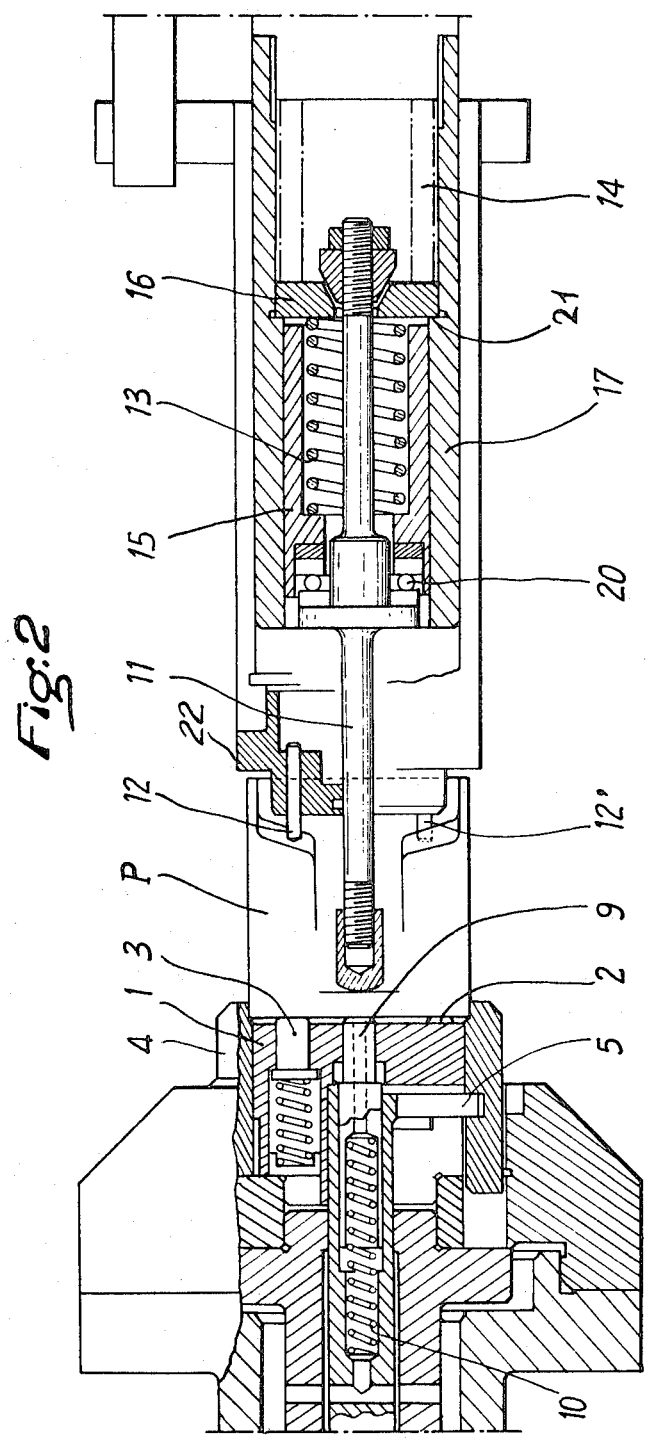
FIG. 2 represents to a larger scale the control portion of the device between the line A–B of FIG. 1.

1. State of the device before presenting a piston :
    1—1 - Spindle side :
        The fingers 3 are pushed into abutment by their spring ;
        The ejector 9 pushed by its spring 10, is in abutment ;
        The ring 4 is moved forward by the jack 7, through the intermediary of the spring 8.
    1-2 - Clamping device side :
        The jack 18 being under pressure, its piston rod is in forward abutment ;
        The assembly 17 is at the end of its rear travel, by means of the jack 19 ;
        The cone located to the rear of the rod 11 is in contact with the washer 16.
2. State of the device necessary for indexing (Case of FIGS. 1 and 2) :
    2–1 - Spindle side :
        The fingers 3 are still in abutment, pushed by their spring ;
        The piston P, subjected to the action of the clamping device, is supported on these fingers 3 and pushes back the ring 4 together with the ejector 9.
    2—2 Clamping device side :
        The jack 18 is still under pressure ;
        The jack 19 has moved the device 17 forward and therefore the piston ; the jack 18 is under pressure and serves as an abutment ;
        In this case, the rod 11 acts on the piston P ; the cone located at its rear extremity is no longer in contact with the washer 16 ;
        The slide 15 coupled axially to the rod is not in contact with 16 and is only subjected to the action of the spring 13.
3. Indexing :
    The spindle is set in rotation at low speed ; it drives by adherence the piston P, which is stopped angularly against the fingers 12 and 12'. The spindle is indexed in turn.
    The piston P and the spindle having been separately indexed with respect to the frame of the machine are thus in consequence indexed with respect to each other.
    The reverse movement of the sheath 22 ensures the withdrawal of the fingers 12 and 12'.
4. State of the device necessary for half-finish machining.
    4–1 - Spindle side :
        The ring 4 is withdrawn by means of the jack 7 and the spring 6 ;
        The piston P is supported at 52 and offers its lateral surface completely ;
        The fingers 3 and the ejector 9 are pushed back by the piston P.
    4-2 - Clamping device side :
        The jack 18 having been put off-pressure, its piston has returned under the thrust of the jack 19 ;
        The device 17 thus moves forward by a few millimeters and the washer 16 comes into contact with the slide 15 ; the spring 14 thus applies the necessary clamping force for semi-finish machining.
5. State of the device necessary for finish machining.
    5–1 - Spindle side :
        - Identically the same as 4–1.
    5–2 - Clamping device side :
        The jack 18 being again put under pressure, its rod pushes back that of the jack 19 and therefore pushes back the device 17 which resumes the state 2—2 ;
        The spring 13 applies the clamping force strictly necessary for finish machining.
6. Ejection of the piston :
    6–1 - Spindle side condition :
        The fingers 3 and the ejector 9 are pushed into abutment by their spring. The ejector 9 ensures the moving away of the piston ;
        The ring 4 remains withdrawn.
    6–2 - Clamping device side condition :

The jack 19 remains under pressure ;

The jack 19 has moved back the device 17.

Figure 5:
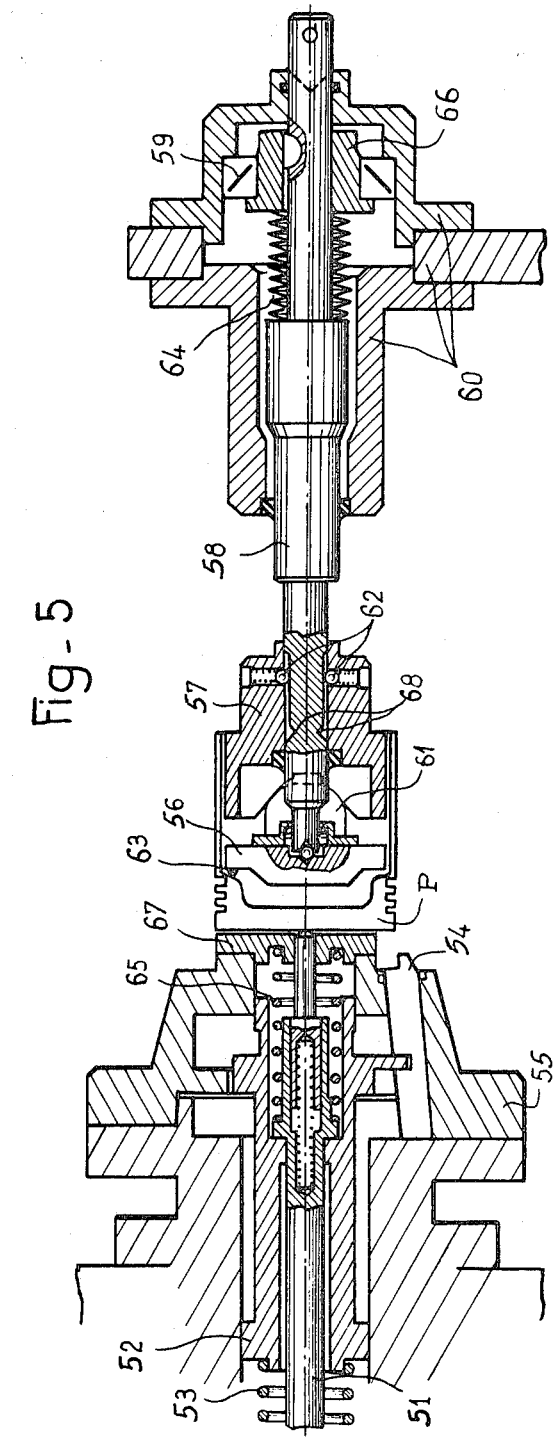
FIG. 5 represents another form of construction of the device, seen in cross-section.

As can be seen from FIG. 5, the reception members of the piece to be clamped, which in the present case is a piston P, comprise a rod 51 which is in co-operation with a jack (not shown) and is surrounded by a member of revolution 52 associated with a spring 53. The reception members also comprise three centering fingers 54 guided by the mandrel 55 and a supporting plate 67 provided with three supporting toes for the upper face of the piston P. The centering fingers 54 are synchronized by a piece 2.

In the piston P are fitted two members 56 and 57, one a supporting member 56 and the other an indexing member 7, fixed on the extremity of a thrust rod 58 which is articulated by a swivel joint at the level of the bearing 59. The push-rod 58, actuated by a jack (not shown) can rotate in the interior of a casing constituted by the assembly of parts 60. The piece 57 is an indexing ring comprising V-shaped parts which co-operate with the bosses 61 of the axial hole of the piston P. This piece 57 is also movable longitudinally through the intermediary of the balls 62, on the rod 58 which carries at its extremity a rocking lever 56 comprising three toes 63 for supporting the piston P. The hollow parts 68 of the two grooves of the push-rod 58 serve as a housing for the balls 62 during the return movement of the thrust rod 58.

The spring 64, mounted on the end rod of the push-rod 58 ensures the clamping force and is supported for reaction against the abutment 66 which receives the swivel-joint bearing 59 in the casing 60. The spring 65 tends to move apart the rod 51, the piece 52 and the centering fingers 54.

The operation of the device is as follows :

The rod 51 is moved forward by a jack (not shown) and frees the piece 52 which is pushed by the spring 53 and causes the forward movement of the centering fingers 54 guided by the mandrel 55.

The piston P, fitted on the indexing piece 57 and the support piece 56 is then presented to the centering fingers 54 by the forward movement of the push-rod 58 slightly articulated as a swivel joint at the level of the bearing 59. This push-rod 58 is actuated by a jack, not shown, through the assembly of parts 60. The bosses of the axial hole 61 of the piston are housed in the V-shaped portions of the indexing piece 57. The indexing is then carried out by the pressure of the V-shaped parts on the bosses 61 at the moment when the piston head passes into the centering fingers 54 at the entrance chamfers and is centered inside the said fingers.

The centering and indexing are therefore simultaneous. Under the effect of the pressure applied by the push-rod 58, the two balls 62 leave their respective housing and the push-rod 58 carrying the rocking lever 66 is applied by its three toes 63 against the piston. During the retraction of the push-rod 58, the piece 57 is re-set by coming into abutment against a finger, not shown and the balls 62 then enter their respective stop V's. The clamping force is provided by the spring 64.

It should be noted that the clamping force is only transmitted by the push-rod 58, and that, at this moment, no effort is transmitted by the piece 57.

The fingers 54 are retracted by reversing the jack actuating the rod 51. The spring 65 than pushes back the rod 51, the piece 53 and in consequence the fingers 54.

All the generator line of the piston P is then free for machining. The head of the piston 53 is solely fixed between the three supporting toes of the plate 67 and the three corresponding supporting toes of the rocking lever 56 and is not for this reason subjected to any clamping distortion.

What is claimed is:

1. A clamping device for pieces to be machined adapted for the initial centering and indexing of the work piece such as a piston comprising:
   a receiving member adapted for frontly supporting the head of the work piece;
   retractable fingers positioned on said receiving member for initially indexing said work piece;
   fixed support members positioned on said receiving member for supporting said work piece;
   a retractable centering element surrounding said receiving member for initially centering said work piece and adapted to be retracted away from the work piece during the machining operation;
   an oscillating thrust rod free for rotation about its own axis and elastically coupled to a thrust body;
   said oscillating thrust rod supporting said work piece on the head of the work piece opposite to its front supporting face on said receiving member; and
   indexing fingers rigidly fixed to said thrust body and supported for annular abutment on the bosses of the axial holes of a piston for initial indexing and adapted for retractable movement along with said thrust body whereby said indexing fingers do not engage said work piece during the machining operation.

2. A clamping device for a piston according to claim 1, wherein said receiving member comprises a circular plate and said fixed support members are three members placed in the vicinity of the periphery of said plate and spaced apart by 120°.

3. A clamping device for a piston according to claim 1, wherein said retractable finger members are three members arranged at 120°, said fixed supports are three supports arranged at 120° with each support comprising four truncated pyramids and said indexing fingers comprise two fingers on opposite sides of said oscillating thrust rod.

4. A clamping device for a piston according to claim 1, wherein said oscillating thrust rod is displaced with respect to said receiving member by two oppositely-acting jacks.

5. A clamping device for a piston according to claim 4, wherein said rod is applied by a predetermined force on the bottom of the piston under the action of two springs interposed between the rod and the thrust body which act independently.

* * * * *